United States Patent [19]

Healey

[11] 3,810,117

[45] May 7, 1974

[54] STACK MECHANISM FOR A DATA PROCESSOR

[75] Inventor: Robert A. Healey, Endicott, N.Y.

[73] Assignee: International Business Machines Corporation, Armonk, N.Y.

[22] Filed: Oct. 20, 1972

[21] Appl. No.: 299,499

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,200,379 | 8/1965 | King et al. | 340/172.5 |
| 3,292,152 | 12/1966 | Barton | 340/172.5 |
| 3,292,153 | 12/1966 | Barton et al. | 340/172.5 |
| 3,401,376 | 9/1968 | Barnes et al. | 340/172.5 |
| 3,461,434 | 8/1969 | Barton et al. | 340/172.5 |
| 3,546,677 | 12/1970 | Barton et al. | 340/172.5 |
| 3,548,384 | 12/1970 | Barton et al. | 340/172.5 |
| 3,560,935 | 2/1971 | Beers | 340/172.5 |

OTHER PUBLICATIONS

Hauck, E. A. et al., "Burroughs' B6500/B7500 Stack Mechanism," Spring Joint Computer Conference, 1968, pp. 245–251.

*Primary Examiner*—Raulfe B. Zache
*Attorney, Agent, or Firm*—John C. Black

[57] ABSTRACT

A storage device (hereinafter referred to as a high speed stack) having an access speed compatible with that of its processor has operands and/or operators entered therein (a push operation) and removed therefrom (a pop operation) for processing in a last-in-first-out order. The number of entries stored in the stack at any moment can become very large due to the nesting of operators. Since it is not economically feasible to provide a large capacity high speed stack, overflow of the stack into a slower speed storage device (hereinafter called a low speed stack) is provided. "Roll out" of entries to the low speed stack and "roll in" of the entries back to the high speed stack is effected as the high speed stack becomes relatively full and empty. A backup register, which normally stores the last entry transferred to the low speed stack, permits delay of roll in, roll out operations until the last possible moment. When a new entry is to be stored into the high speed stack (hereinafter referred to as a push operation) and the stack is full, the new entry is put into the backup register, a selected number of entries are rolled out from the high speed stack to the low speed stack and the new entry is then transferred from the register to the high speed stack. Roll in is not initiated even when the high speed stack is empty since the next available entry in the slow speed stack is available in the backup register for fast access by the processor. Only after the entry in the backup register is accessed for processing, the high speed stack being empty, does roll in of entries from the low speed stack to the high speed stack begin. High speed stack top and bottom pointers and a slow speed stack pointer are incremented and decremented to address the stacks and to determine the full, empty states of the high speed stack. With the stack bottom movable, the number of entries left in high speed storage on a roll out (or the number of entries not filled with valid data on a roll in) can be controlled by the roll in and roll out routines. Thus the stack mechanism can be tuned to an optimum based on the program language being processed.

11 Claims, 17 Drawing Figures

ROLL IN ROUTINE

STACK MECHANISM FOR A DATA PROCESSOR

BACKGROUND OF THE INVENTION

This invention relates to data processors which are organized so as to operate according to a machine language which is closely related to high level problem program languages. One example of such a processor is shown in U.S. Pat. No. 3,200,379.

The improvement is directed to the control means and method for tuning a last-in-first-out stack mechanism contained in two different speed storage media in such a data processing system. More specifically, the improvement minimizes roll out and roll in operations between the two storage media and allows the stack to be tuned for optimum performance based on the program language being processed by the system.

In any processor using a stack mechanism to store operators and/or operands, it is desirable to have the stack contained in a storage media with a speed compatible to the speed of the processor itself. This is not always economically feasible because the number of entries on the stack can become very large due to the nesting of operators.

The normal solution for this is to have some fixed number, X, of high speed storage locations and allow any overflow to be contained in a sloWer speed storage media. Normal operation when high speed storage is full, is to roll out its X entries into the slower speed storage. Now the high speed storage locations are again available for storing (pushing) X number of entries onto the stack.

When reading (popping) entries from the stack for processing, the procedure is reversed. When the high speed storage contains no more valid entries, X entries are rolled in from the slow speed storage. This method requires only two pointers; the stack top pointer (STP) for the high speed storage, and the slow speed storage pointer (SSP).

The danger of the above method is that the program being processed will enter a mode of operation that requires alternate push and pop operations which in turn require a roll out and roll in for each operation. Considerable degradation of system performance results from excessive roll out, roll in operations.

Another proposal is shown in U.S. Pat. No. 3,401,376. In this patent, the high speed stack includes a store for twelve entries and two hardware registers for the top two entries. As soon as the store is full, four entries are transferred to a low speed store. When the high speed store has lesS than four entries, four entries are rolled in from the low speed store. All poP or push operations require transfer between the registers and between one of the registers and the high speed store.

SUMMARY OF THE INVENTION

It is an object of the present invention to delay roll out or roll in of entries in a high speed stack mechanism until the latest possible time.

The roll out delay is accomplished by providing a backup register to store the data for one additional push operation after the high speed storage stack is full before calling the roll out routine. Roll in is delayed by duplicating in the backup register the last entry in the overflow storage for one additional Pop operation after the high speed stack is empty.

The high speed stack mechanism is provided $2^n$ entry positions (sometimes referred to as registers) in order to permit a simplified economical wraparound addressing mechanism. The addressing mechanism provides a register for a stack top pointer which points to the last entry in the stack. An incrementer and a decrementer update the pointer when entries are put on (push operation) the stack or removed from the stack for processing. A second register holds the stack bottom pointer which points to the first stored entry of those in the stack. An incrementer and decrementer update the stack bottom pointer as each entry is rolled out from or rolled into the stack. A third register holds a pointer to the last entry of a stack overflow area in a slower speed store. An incrementer and decrementer update the latter pointer during roll out and roll in routines. Means including compare circuits initiate roll out and roll in routines as well as controlling the pushing of entries into and the popping of entries from the backup register.

With the movable stack bottom pointer, the stack bottom need not be implicitly implied, and the number of entries rolled out to slow speed storage or rolled in from slow speed storage is controlled by roll out/roll in microprograms. This allows for tuning the stack to an optimum for the program language being processed.

It is therefore an object of the present invention to provide means for tuning the high speed stack for optimum performance for each program language being processed.

A program controlled register is provided for storage a value equal to the number of entries to be rolled out and rolled in. Each microprogram control word execution which rolls an entry out (or in) decrements the value in the register. When the value equals zero, roll out or roll in is terminated. The particular program being executed preferably enters the initial value unto the register when execution of a roll out or roll in routine is initiated.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
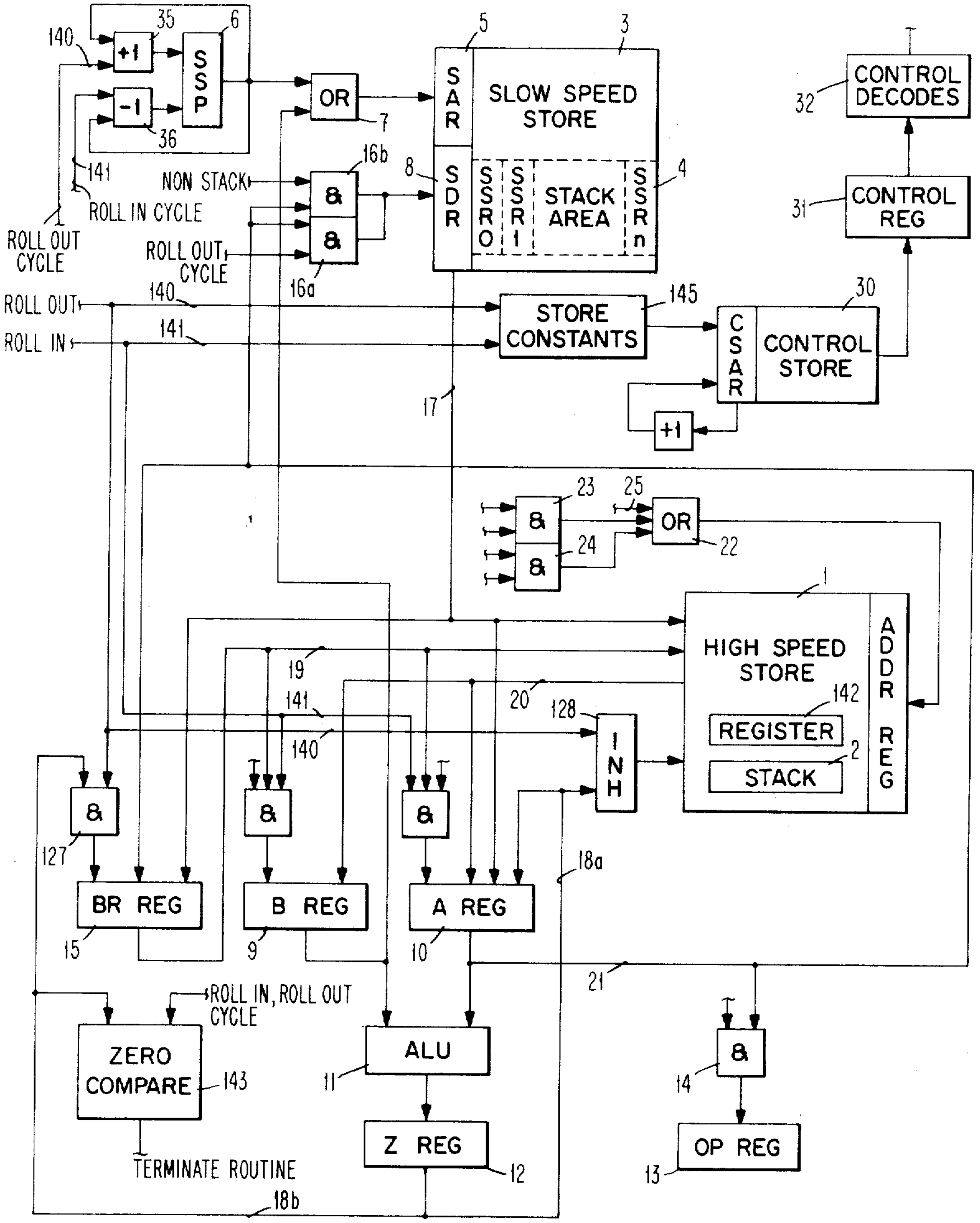
FIG. 1 illustrates a processor, stack mechanism and slow speed store incorporating the present improvement.

The system illustrated diagrammatically in FIG. 1 preferably uses microprogram control and data paths generally of the type illustrated in detail in U.S. Pat. No. 3,656,123 issued Apr. 11, 1972. Gates controlled by the microprogram will not therefore be shown. Briefly the system includes a conventional main store 3 and a processor including an ALU 11 and a high speed local store 1 associated with the processor. Input A and B registers 9 and 10 are provided for the ALU 11 and a Z register 12 is provided at the ALU output. The processor is preferably of the type which is operated in accordance with microprogram control word routines which are held in a control store 30. As each control word is read from the store 30, it is entered into a control register 31. Control decode circuits 32 operate the processor through a machine cycle in response to each control word entered into the register 31. The decode circuits 32 and a clock (not shown) energize gating (AND) circuits (not shown) to complete the data paths for effecting the transfer of data throughout the system in a known manner.

The processor utilizes a stack mechanism 2 in the high speed storage media (store) 1 to contain operators/operands and uses a stack area 4 in the slower speed storage media (store) 3 to contain any stack overflow from the high speed storage 1.

The stack mechanism 2 is accessed via OR circuit 22 and AND circuit 23 or 24, by either the stack top pointer STP or the stack bottom pointer SBP as will be seen later. The non-stack portion of store 1 is accessed via bus 25 and OR circuit 22.

The pointers STP and SBP are used to access the stack only during push (store) and pop (read) operations and during roll out and roll in routines. All such accesses are to the stack 2. All other accesses to the store 1 are by way of bus 25.

Store 1 has a plurality of entries. Bus 17 and input/output storage data register (SDR) 8 provide a path for data (operators/operands) from the store 3 to store 1 and registers 10, 15. During roll in operations from stack area 4 to stack 2, data is transferred via bus 17, BR register 15 and bus 19. Bus 18*a* and a Z-register 12 allow intermediate results of ALU 11 functions to be placed on (push) the stack 2 or returned to the A register 10 for further processing. Bus 18*b* provides a path from the register 12 to the backup (BR) register 15. Bus 19 provides a path for data from the BR register 15 to the stack 2 in store 1 and to registers 9, 10.

Information from the stack 2 in store 1 is read out on bus 20 to either the A-register 10 or the B-register 9. This information can be gated to the ALU 11 for arithmetic or logical operations. The output of the A-register 10 is gated to the Op register 13 via AND circuit 14 when an operator entry is popped from the stack 2. The output of the A-register 10 is gated via bus 21, AND circuit 16*a*, and the SDR register 8 to the stack area of slow speed storage 3 on a roll out operation. Path 21 and AND gate 16b provide a path from the register 10 to store 3 for non-stack data store operations.

The BR register 15 provides a storage means for storing one additional stack entry after the stack 2 is full and a push operation occurs. It also allows for one extra pop operation after the last valid stack entry has been popped From stack 2 because it stores a copy of the last valid entry in the stack area 4 of slow speed storage 3.

The storage address register (SAR) 5 receives addresses for accessing slow speed storage 3, via OR circuit 7, and from either the B-register 9 for addressing non-stack areas or from the slow speed pointer SSP in register 6 for roll out or roll in routines which address the stack area 4. An incrementer 35 and a decrementer 36 update the pointer SSP during roll out and roll in routines.

Figure 2:
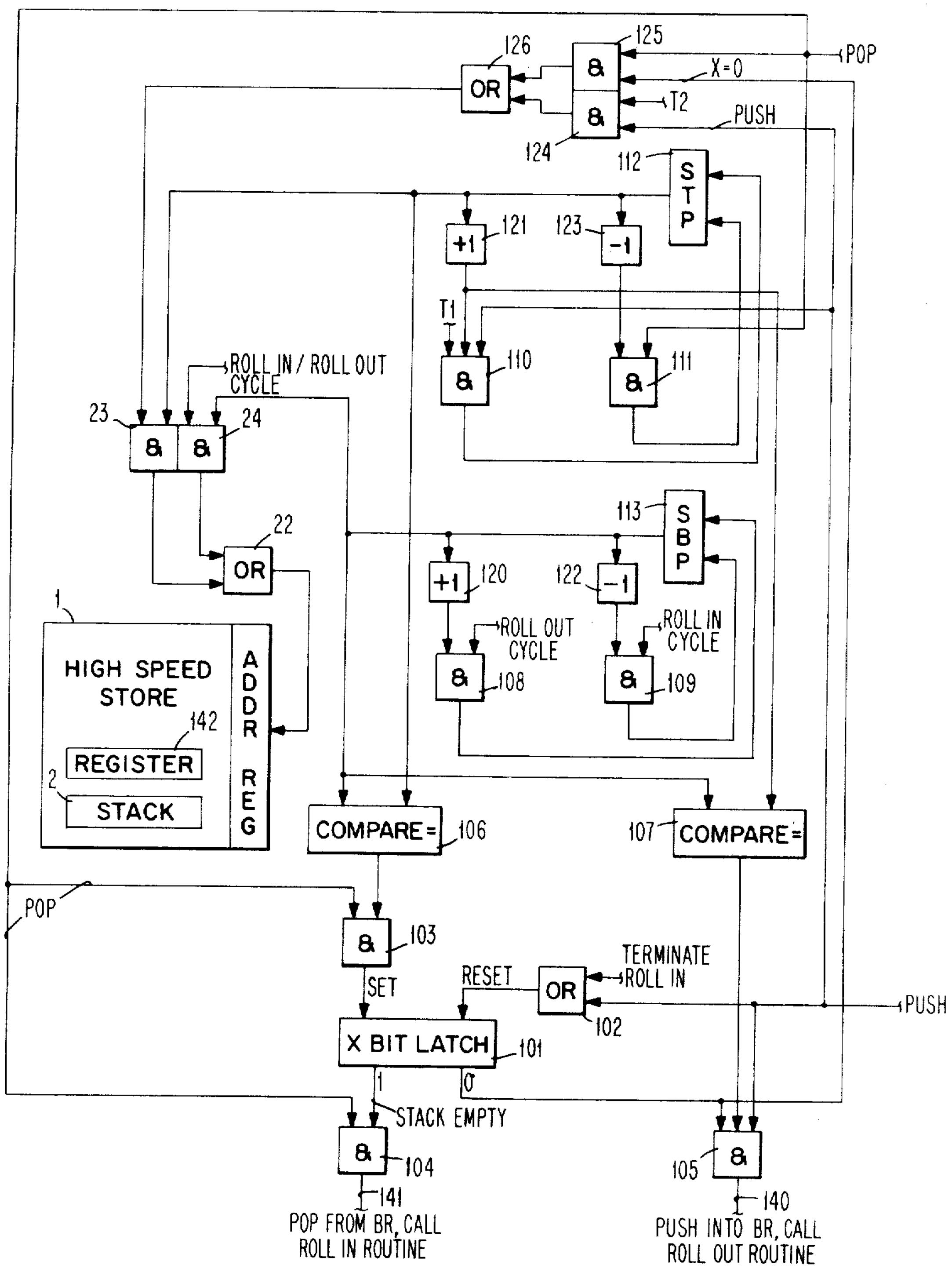
FIG. 2 illustrates a preferred form of the improved stack addressing mechanism and roll in, roll out controls; and FIGS. *3a–3c*, *4a–4f* and *5a–5f* illustrate by example push and pop operations and roll out and roll in routines.

FIG. 2 shows the hardware necessary for addressing and control of the stack 2 in high speed storage 1. The register 12 and the register 113 which hold the pointers STP and SBP always point to valid entries on the stack 2 when the X-bit = 0 condition exists in latch 101. The X-bit = 1 condition indicates that there are no valid entries in the high speed stack 2.

The X-bit latch 101 is reset to X-bit = 0 via OR circuit 102 on each push operation to the stack 2 and at the end of each roll in routine. The latch 101 is set to the X-bit = 1 condition via AND circuit 103 and compare circuit 106 when the last valid entry is popped from the stack 2 (stack empty). A subsequent pop operation gates AND circuit 104 to pop an entry from the backup register 15 and to call the roll in routine as will be seen below. The roll in is delayed until the latest possible moment by providing this one additional pop from the backup register 15.

Compare circuit 106 compares the stack top pointer STP in register 112 and the stack bottom pointer SBP in register 113. When the pointers STP and SBP are equal, there is one valid entry left in stack 2 and AND circuit 103 is prepared. A subsequent pop operation gates circuit 103 to set the X-bit = 1 in latch 101 indicating that the last valid entry has been popped from the stack. An additional pop operation obtains the next entry from the BR register 15 via AND gate 104 and initiates a roll in routine.

Compare circuit 107 indicates the stack full condition (SBP = STP+1). With the X-bit = 0 from a previous push operation and SBP = STP+ 1, a push operation gates AND circuit 105 to push data to the backup register 15 and to initiate the roll out routine.

The compare circuit 107 can detect SBP = STP+1 when stack 2 is empty (as will be seen below in the example). However, the X-bit = 1 and a subsequent push operation will not push data to the register 15 and call the roll out routine because AND circuit 105 is degated by the X-bit = 0 line.

The use of the register 15 to store one additional push entry or to provide one additional pop entry minimizes the thrashing that occurs in prior art embodiments when the program being processed enters a mode of operation that requires alternate sequences of push and pop operations which in turn require a roll out and a roll in.

The stack 2 requires $2^n$ entry positions in order to permit an economically feasible wraparound address updating mechanism (i.e. registers 112, 113, incrementers 120, 121, and decrementers 122, 123) for pointers STP and SBP. The register 15 significantly improves the performance of the fixed length stack.

AND circuits 108, 109, 110, and 111 control incrementing and decrementing of the stack top pointer STP register 112 and the stack bottom pointer SBP in register 113 as each entry is stored into or read from the stack 2. AND circuit 23 gates the pointer STP to address the corresponding entry location in the high speed storage stack on push and pop operations. AND circuit 24 gates the pointer SBP to address a corresponding entry location in the stack during roll out and roll in routines.

The pointer STP must be updated before addressing stack 2 during push operations. Hence AND circuits 110 and 124 are provided with sequential clock signals T1 and T2 to gate the updated value of pointer STP to the store 1 via OR circuit 126. During a pop operation, the pointer STP can be gated to the address register of store 1 only if there is a valid entry in stack 2. Hence an X = 0 (valid entry) input and a pop input are provided to AND circuit 125 which is coupled to AND circuit 23 via an OR circuit 126.

A pop operation involves the execution of a microprogram word in the preferred embodiment. One function performed during a pop operation is the transfer of an operand or operator entry from the stack 2 to the B or A registers 9, 10. In the event that the entry is an operator, the entry is gated into the op register 13 by way of the AND circuit 14. In the event that the entry is an operand, it is held in the A or B register 9, 10 until a second operand is stored in the other register 9, 10 and the operator to be executed is in the op register 13. The logical or arithmetic function to be performed on the operand entries is then executed.

In the event that the stack 2 is empty when a pop operation is initiated, the entry in the BR register 15 is transferred into the register 9 or the register 10 under microprogram control.

The results of the arithmetic or logical function performed on the operands in registers 9 and 10 are transferred into the Z register 12. During a succeeding push operation, these results in register 12 are transferred alternatively to the top of stack 2 or into the A register 10. In the latter instance where the results are transferred from register 12 to register 10, the results are used as an entry for the next arithmetic or logical function.

In some instances the entry poped from the stack 2 or the BR register 15 is the address of data stored in the non-stack area of main store 3. In this instance the entry is popped into the B register 9 and the address is then gated to the storage address register 5 of main store 3 by way of the OR circuit 7. A data entry transferred to the A register 10 during a preceding (or succeeding) pop operation is then transferred via bus 21 and AND circuit 16*b* to the selected address in main store 3. Alternatively the address provided to the address register 5 by way of the B register 9 is utilized to read data from the non-stack area of main store 3 into the A reglster 10. This entry in register 10 is then used in a logical or arithmetic function in accordance with the operator in register 13.

Addresses popped into the B register 9 for accessing slow speed storage 3 also are used to fetch entries from the non-stack area of store 3 which entries are then pushed on stack 2 by way of bus 17.

The roll out routine will now be described in more detail. It will be assumed that during a push operation the pointer STP is incremented and the compare circuit 107 finds the incremented value of the pointer STP equal to the value of the pointer SBP. Assuming that the latch 101 is in the logical zero state indicating that there are valid entries in the stack 2, the equal compare by circuit 107 indicates that the stack 2 is full. Consequently the output signals from the compare circuit 107 and the latch 101 together with the push signal gate the AND circuit 105 to produce a signal on line 140.

The push data which has been fetched from the non-stack area of the main store 3 is transferred from the output register 8 to the Z register 12 by way of A register 10 and the ALU 11. The push data could also have been in the Z register 12 initially. The line 140 gates the output of the Z register 12 into the BR register 15, via AND circuit 127, and inhibits the output of the Z register 12 to stack 2 by means of inhibit circuit 128.

In addition, the line 140 forces a fixed branch address in a store 145 (for storing constants) to the storage address register of the control store 30 to branch to the first microprogram control word of the roll out routine.

The tuning value for the particular program being executed is entered into the register 142 of store 1 and the processor is ready to roll out entries from the stack 2 to the stack area 4. Each entry rolled out from the stack 2 to the stack 4 is transferred via bus 20, the A register 10, bus 21, and AND circuit 16a. The pointer SBP is gated via AND circuit 24 to select each entry from the stack 2 for roll out. The pointer SSP in register 6 is utilized to select one of the registers SSR1 to SSRn in the stack area 4 in which the rolled out entry is to be stored.

The pointers SBP and SSP are incremented as each entry is rolled out. For each entry rolled out, the value in the register 142 of store 1 is transferred to the A register 10, is decremented by the ALU 11, transferred to the Z register 12, and then returned to the register 142. While it is in the Z register 12, the value is checked to determine whether or not it is zero. In the event that it is zero, the roll out routine is terminated.

The above series of steps are repeated to roll out entry after entry until the decremented value from the register 142 reaches zero. At this time, a branch is taken to the routine which was being executed before initiation of the roll out routine. When the routine is being terminated, the push entry which still exists in the BR register 15 is pushed onto the stack 2 and the last valid entry rolled out from the stack 2 and still held in the A register 10 is transferred to the BR register 15 by way of the ALU 11, the Z register 12, and bus 18*b*.

The roll in routine will now be described. It will be assumed that one valid entry still resides in the stack 2 and a pop operation is taken. With only one valid entry still remaining in the stack 2, the pointers SBP and STP will be equal whereby the output of the compare circuit 106 and the pop signal will gate the AND circuit 103 setting the X-bit = 1 in latch 101. It will then be assumed that another pop operation is taken. The output of the latch 101 and the pop signal gate the AND circuit 104 to produce a signal on line 141. The signal on line 141 together with the microprogram will cause the entry in the BR register 15 to be gated alternatively to the B or A registers, 9, 10.

The signal on line 141 also causes the store 145 to supply a branch address to the control store 30 for accessing the first microprogram word in the roll in routine. As in the case of the roll out routine, the tuning value for the particular program being executed is entered into the register 142 in store 1. In order to roll in the first entry from the stack area 4 to the stack 2, the pointer SSP is first decremented since it points to an empty register in the area 4. The decremented value of SSP is then applied to the storage address register 5 for accessing the last entered valid entry in the stack area 4. (It will be seen below with respect to the example that this entry is the same entry as was transferred from the BR register 15 to the register 9 or 10.) The pointer SBP is decremented and the decremented value of the pointer is gated via AND circuit 24 to access the position in stack 2 into which the entry is to be rolled. The entry is then transferred from the register 8 of the store 3 to the stack 2 by way of bus 17, the BR register 15, and the bus 19. The tuning value in register 142 is transferred to the ALU 11 by way of the A register 10, is decremented and returned to the register 142 by way of the Z register 12 and bus 18*a*. While the decremented value is in the Z register 12, the circuit 143 determines whether or not it is equal to zero. Using the same sequence of steps, each entry in the stack area 4 is transferred to the stack 2 until the circuit 143 detects the decremented tuning value to be equal to zero. At this time the roll in routine is terminated.

However, before termination, the next valid entry in the stack area 4 is transferred to and held in the BR register 15. Also a signal is applied to reset the latch 101 by way of OR circuit 102. Prior to the transfer of the last valid entry in stack area 4 to the BR register 15, the pointer SSP in register 6 was decremented. After this operation the pointer SSP must be incremented so that it now points to the first empty location in the area 4.

FIGS. *3a–3c*, *4a–4f* and *5a–5f* show the contents of stack 2 and the backup register 15, the values of the stack pointers STP and SBP, and the condition of the X-bit for an example of push, pop, roll out, and roll in operations. Reference is directed to these figures in conjunction with FIG. 2 for the detailed description of the example described below.

Push Operation (FIGS. *3a*, *3b*)

Figure 3A:
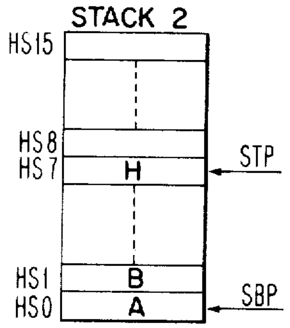
Figure 3B:
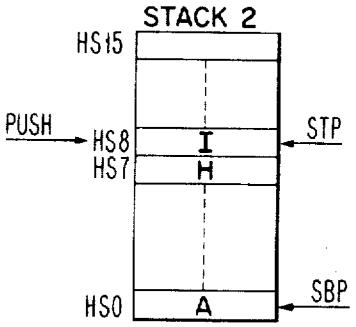
Figure 3C:
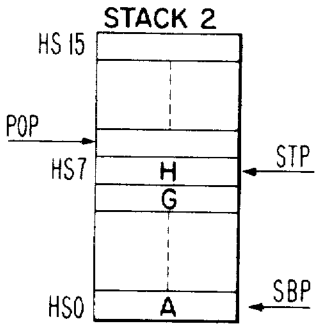

The stack top pointer STP initially points to entry location HS7 of stack 2 (FIG. *3a*). The pointer STP is updated +1 to point to location HS8 during the push operation via AND circuit 110 and incrementing circuit 121. AND circuit 23 gates the updated pointer STP to access the high speed storage 1 and the push data I is stored in location HS8 in stack 2 (FIG. 3b).

Pop Operation (FIG. *3c*)

During a subsequent pop operation, the data I is popped from the high speed storage location HS8 addressed by the stack top pointer STP. The pointer STP is then decremented by one via AND circuit 11 and decrementer 123 and again points to the next valid entry H in location HS7 on the stack 2.

Roll Out Routine (FIGS. *4a–4f*)

Roll out of the high speed storage stack is delayed until the latest possible time. The conditions to cause a roll out are stack full (SBP = STP+1), detected by compare circuit 107, X-bit in latch 101 set to zero (by a previous push operation), and another push operation initiated. These conditions produce a signal at output 140 of AND circuit 105, FIG. 2, which causes the push data Q to be transferred to the backup register 15 from register 12. The roll out routine is initiated by branching to the first control word of the routine in store 30. The stack top point STP is incremented via AND circuit 110 and incrementer circuit 121 as in the normal push operation.

The roll out routine initially applies a pulse to AND circuit 24 to gate the stack bottom pointer SBP to the address register of store 1. The data in the location addressed by the pointer SBP is rolled out to store 3 via bus 20, A-register 10, bus 21, and AND circuit 16a as shown in FIG. 1. The rolled out data is stored in the slow speed storage stack area 4 in the location identified by the slow speed storage pointer SSP in register 6, and the pointer SSP is updated by incrementer 35. The pointer SBP is updated via AND circuit 108 in FIG. 2 and incrementer 120 so that it points to the next entry to be rolled out.

Additional entries are rolled out in the same manner, and the pointers SSP and SBP are updated for each entry until the selected number of entries have been rolled out. The number of entries rolled out is controlled by the roll out microprogram and a register 142 in store 1. During the execution of the first microprogram word of the roll out routine, the register 142 is filled with a value equal to the number of entries to be rolled out. During the roll out of each entry, the microprogram reads out, decrements and stores back the value in register 142. When the value reaches zero, the roll out routine is terminated and a branch to the problem program is taken. This condition is detected by compare circuit 143.

Figures 4A, 4B, 4C:
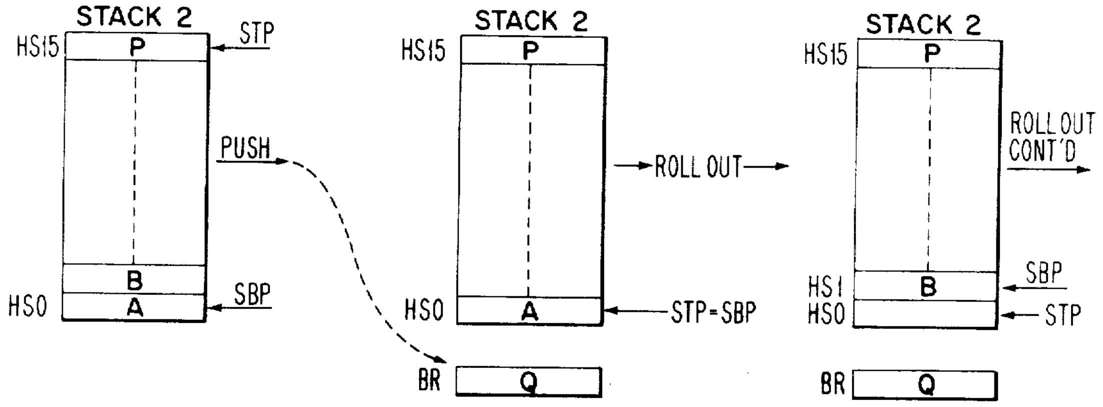
Figures 4D, 4E, 4F:
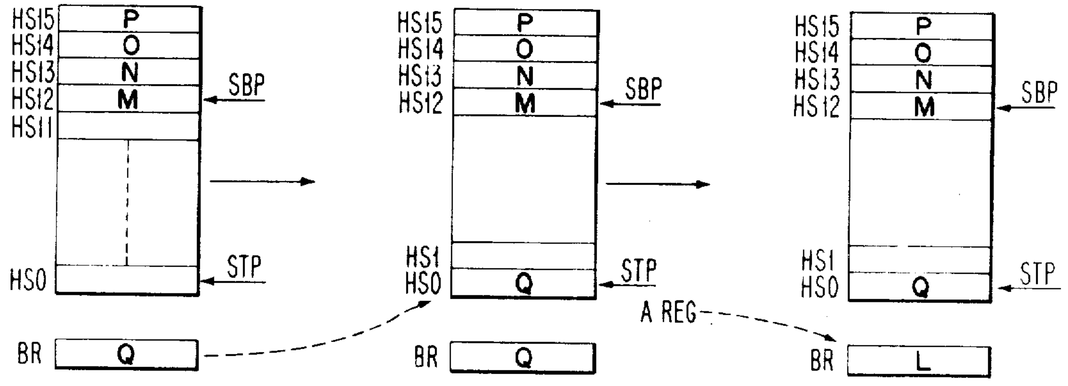
Figures 5A, 5B, 5C, 5D, 5E, 5F:
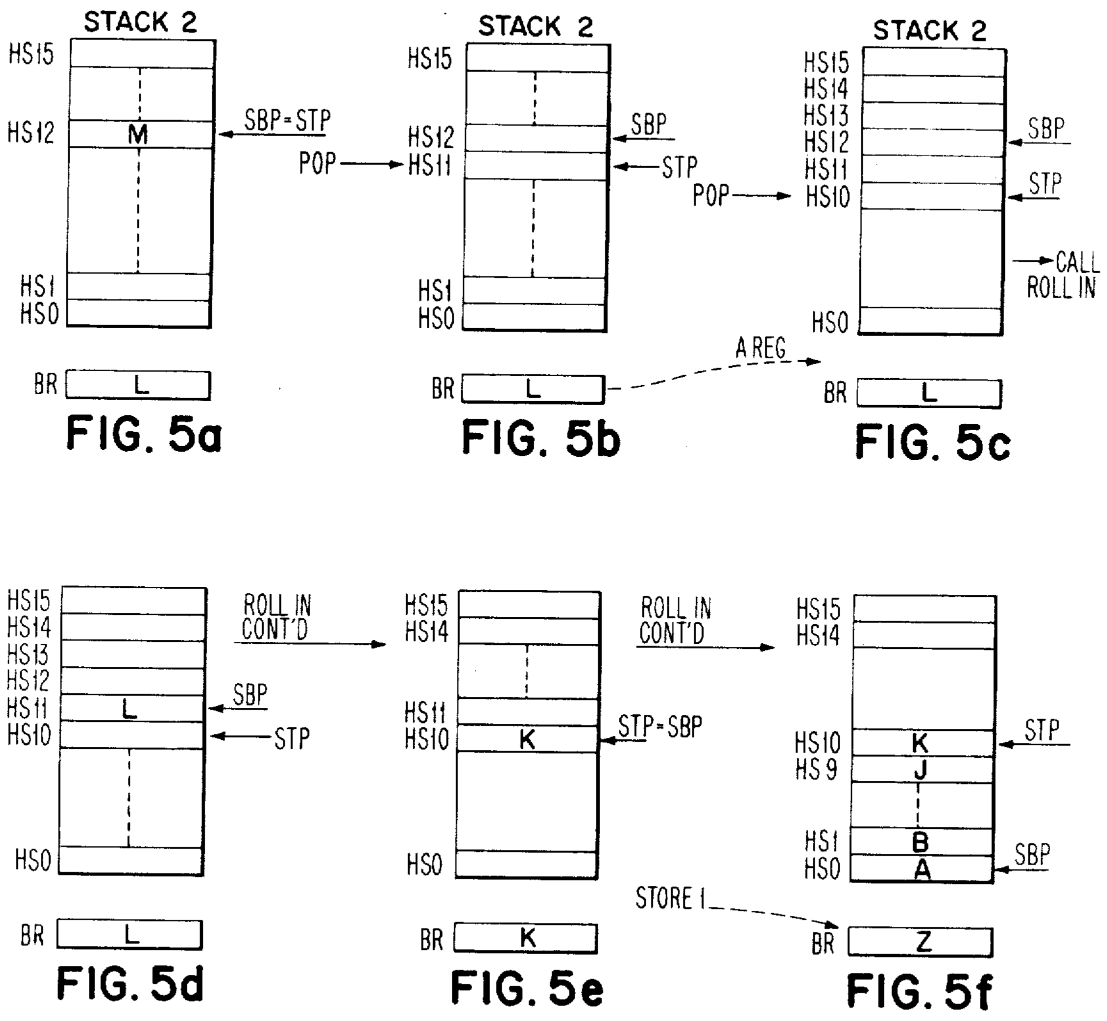

FIGS. 4a-4f show 12 entries A-L rolled out and the pointer SBP updated to point to entry M in stack register HS12, the new stack bottom. More specifically, FIG. 5a shows the stack 2 full, with entries A-P in locations (i.e. registers HSO-HS15. The stack top pointer STP points to location HS15 and the stack bottom pointer SBP points to location HS0. A push operation is initiated. The pointer STP is incremented (i.e. changes from binary 1111 to binary 0) and compare circuit 107 detects SBP = STP+1 to produce an output signal. Since the X bit = 0 in latch 101, the AND circuit 105 produces an output signal on line 140 to store the push data Q in the BR register 15 (FIG. *4b*). A branch is taken to the roll out routine in control store 30. Entries A-L are rolled out to stack area 4, the pointer SBP is incremented twelve times to point to location HS12 and the register 142 is decremented to zero (FIG. 4d).

Then the contents Q of the BR register 15 are stored in the high speed storage location HS0 indicated by the pointer STP (FIG. *4e*). Finally, the last entry L rolled out to slow speed storage (still in the A-register) is stored into the BR register 15 (FIG. *4f*). This provides the data in the BR register 15 for one additional pop operation at a later time.

Roll in Routine (FIGS. *5a–5f*)

The initial conditions for initiating roll in are shown in FIG. *5a*. The stack 2 has one valid entry M in location HS12, SBP=STP, X-bit = 0 from a previous push operation, and the BR register 15 contains a copy of the top stack entry L in the slow speed storage stack area 4 (from the previous roll out described above).

The next pop operation pops the last valid entry M from the stack for processing (FIG. 5b). The output of the compare circuit 106 and the pop signal gate AND circuit 103 to set the X-bit in latch 101 to logical 1. The pointer STP is decremented by one.

If the next operation is a pop operation, the output of latch 101 and the pop signal gate AND circuit 104 to produce a signal on line 141. This pops the data L (duplicate of the top slow speed storage entry) from the BR register 15 for processing, initiates the roll in routine in store 30, and decrements pointer STP by one (FIG. 5c).

The roll in routine first decrements the slow speed storage pointer SSP by one. The entry L is then read out of the slow speed storage location in stack area 4 indicated by the pointer SSP (in register 6) to the storage data register 8. The stack bottom pointer SBP is decremented by one and the SDR data (L) is stored via bus 17 and BR register 15 in the location HS11 indicated by the pointer SBP (FIG. *5d*). This entry L in high speed storage stack 2 is invalid because it was already used in the pop from the BR register 15, but since pointers STP and SBP differed by two entry positions when roll in started, this entry will never be used and the stack top pointer will point to the new stack top at register HS10.

Next the pointers SSP and SBP are decremented and entry K is transferred from the stack area 4 to the stack 2, register HS10 (FIG. 5*e*). Roll in continues until the selected number of entries J-A (controlled by the roll in microprogram) have been rolled in to high speed storage registers HS9-HS0 respectively, and the pointer SBP will indicate the location (HSO) of the last valid entry A (FIG. 5*f*).

As explained with respect to the roll out routine, the register 42 in store 1 is initialized at the beginning of the roll in routine and is decremented with each entry transfer from store 3 to store 1. When the count in register 42 is zero, it signals the termination of the roll in routine.

The roll in microprogram then reads one additional entry from slow speed storage area 4 to the backup register (BR) 15 and sets the X-bit in latch 101 to logical zero via OR circuit 102. The entry read into the BR register 15 may be a valid entry from the slow speed storage stack 4; or it may be a special entry from slow speed register SSR0 to indicate that no valid entries remain in stack area 4 and to provide an end to program execution when it is popped from the BR register 15 at a later time. Finally, the roll in routine increments the pointer SSP by one. This sets the pointer SSP to the first empty location for a later roll out operation when it occurs.

While the invention has been particularly shown and described with reference to a preferred embodiment thereof, it will be understood by those skilled in the art that various changes in form and details may be made therein without departing from the spirit and scope of the invention.

I claim:

1. In a data processing system having a processor and a higher speed stack for storing operand and/or operator entries immediately preceding processing of the entries, the combination with said processor and stack of first means for storing the entries into the stack and for transferring the entries from the stack directly to the processor for processing in a last-in-first-out sequence, a lower speed stack storing overflow entries from the high speed stack, second means for rolling out entries from the higher speed stack to the lower speed stack when the higher speed stack has a predetermined number of valid entries therein, and for rolling in entries from the lower speed stack to the higher speed stack when the valid entry count in the latter stack reaches a predetermined lower value, a backup register normally storing the last entered valid entry in the lower speed stack, third means transferring the backup register entry to the processor upon each roll in of entries from the lower speed stack to the higher speed stack, and fourth means for transferring a new entry to the backup register upon each roll out of entries from the higher speed stack to the lower speed stack and for thereafter transferring the new entry to the high speed stack when the roll out is completed.

2. The combination set forth in claim 1 wherein the second means comprises fifth means including a compare circuit and a latch for determining when the high speed stack entry count is at the predetermined high value, sixth means coupled to said compare circuit and to said latch for initiating a roll out of entries from the high speed latch incident to the receipt of a new entry when the entry count is at said high value, and said fourth means being responsive to said sixth means when it initiates a roll out of entries.

3. The combination of claim 1 wherein the second means is effective to roll entries out of and into the high speed stack after the latter is full and empty respectively.

4. In a data processing system of the type having a stack and a slower speed storage and of the type in which operand and operator entries are pushed into the stack and popped from the stack in last-in-first-out order for processing, and in which overflow entries in the stack are rolled out to the slower speed storage and rolled back into the stack as required, the combination with the stack and storage of means for initiating roll out from the stack to the slower speed storage only in response to a push operation when the stack is full, and means for initiating roll in from the slower speed storage to the stack only in response to a pop operation when the stack is empty.

5. The combination of claim 4 further comprising means including a backup register for holding a new entry during the roll out of overflow entries and for therafter transferring the new entry to the stack, and means including the backup register for normally storing the last of said overflow entries transferred from the stack to the storage and for popping said last overflow entry for processing upon the initiation of a roll in of overflow entries.

6. The combination of claim 4 further comprising system controlled means for varying the number of overflow entries transferred between the stack and storage during roll out and roll in.

7. In a data processing system of the type in which entries are stored in a higher speed stack and are transferred directly from the stack to the processor for processing in a last-in-first-out sequence, in which a lower speed stack stores overflow entries from the higher speed stack when the latter is full, and in which groups of entries are transferred betwen the higher speed stack and the lower speed stack each time that the former is full or empty, a backup register normally storing the last entered entry in the lower speed stack, means for transferring the backup register entry to the processor for processing each time that a group of entries is transferred from the lower speed stack to the higher speed stack, and means for transferring to a new entry to the backup register each time that a group of entries is transferred from the high speed stack to the lower speed stack and for thereafter transferring the new entry to the higher speed stack when transfer of the group is completed.

8. In a data processing system, the combination comprising a stack having $2^n$ positions for storing operand and/or operator entries, first and second registers respectively storing top and bottom pointers which point respectively to the last-entered and first-entered of the valid entries in the stack, incrementing and decrementing means effective during transfers of entries into and out of the stack for updating the pointer values, first means for pushing new entries into the stack and for popping entries from the stack in a last-in-first-out order in accordance with the value of the top pointer, a slower speed storage storing overflow entries from the stack, a register storing a pointer which points to a location bearing a predetermined relationship with the last valid overflow entry in the slower speed storage, a backup register, second means responsive to a push operation when the stack is full for entering the push entry into the backup register and for initiating the roll out of overflow entries from the stack to the storage and for thereafter entering the push entry into the stack and the last overflow entry into the backup register, and third means responsive to a pop operation when the stack is empty for popping the last overflow entry in the backup register for processing, for rolling in a group of overflow entries from the storage to the stack and for entering into the backup register the last overflow entry in storage.

9. In a data processing system of the type having a stack and a slow speed storage and of the type in which operand and operator entries are pushed into the stack and popped from the stack in last-in-first-out order for processing, and in which overflow entries in the stack are rolled out to the slower speed storage and rolled back into the stack as required, the combination with the stack and storage of program controlled means for selecting the number of overflow entries to be transferred during roll out and roll in, means for storing said selected number, and means controlled by the last-mentioned means for terminating each roll out and roll in after the transfer of a number of overflow entries equal to said selected number.

10. In a method of the type in which a group of overflow entries are transferred from a higher speed stack to a lower speed storage when the entries in the stack reach a predetermined count and in which a group of overflow entries are transferred back from the storage to the stack when the entries in the stack reach a predetermined lower count, the improvement comprising the step of varying the number of entries in overflow groups for different programs so as to reduce thrashing between the stack and storage.

11. The method of claim 10 wherein the last-mentioned step comprises the steps of assigning to different programs different desired tuning values which reduce the thrashing of entries between the stack and storage, updating the value in the processor each time that an entry is transferred between the stack and the storage during roll in and roll out operations, terminating the roll in and roll out operations when the updated value is equal to a predetermined number.

* * * * *